US005959979A

United States Patent [19]

Stratmoen

[11] Patent Number: 5,959,979

[45] Date of Patent: Sep. 28, 1999

[54] HALF-DUPLEX COMMUNICATION SYSTEM FOR TELEMETRY MODEMS

[75] Inventor: Scott Alan Stratmoen, Arlington, Ill.

[73] Assignee: Northrop Grumman Corporation, Los Angeles, Calif.

[21] Appl. No.: 08/851,303

[22] Filed: May 5, 1997

[51] Int. Cl.[6] .................... H04B 1/56; H04L 5/16

[52] U.S. Cl. .................... 370/276; 370/277; 370/296

[58] Field of Search .................... 370/465, 466, 370/470, 472, 474, 476, 276, 277, 296; 455/553, 343, 73, 78, 334; 375/222; 379/390, 391, 389

[56] References Cited

U.S. PATENT DOCUMENTS

| | | | |
|---|---|---|---|
| D. 368,911 | 4/1996 | Lam | D14/242 |
| D. 371,770 | 7/1996 | Larson et al. | D14/107 |
| D. 374,675 | 10/1996 | Sakai et al. | D14/242 |
| 4,419,752 | 12/1983 | Sonnenberger et al. | 370/29 |
| 4,569,062 | 2/1986 | Dellande | 375/370 |
| 4,599,719 | 7/1986 | Breen et al. | 370/24 |
| 4,744,092 | 5/1988 | Betts et al. | 375/7 |
| 4,924,456 | 5/1990 | Maxwell et al. | 370/32 |
| 5,001,729 | 3/1991 | Tjahjadi et al. | 375/106 |
| 5,091,906 | 2/1992 | Reed et al. | 370/94.1 |
| 5,151,927 | 9/1992 | Medlicott | 375/119 |
| 5,212,685 | 5/1993 | Stilwell, Jr. et al. | 370/31 |
| 5,265,264 | 11/1993 | Dzung et al. | 455/90 |
| 5,331,318 | 7/1994 | Montgomery | 340/855.4 |
| 5,349,635 | 9/1994 | Scott | 379/97 |
| 5,355,368 | 10/1994 | Dore et al. | 370/95.3 |
| 5,373,149 | 12/1994 | Rasmussen | 235/492 |
| 5,386,340 | 1/1995 | Kurz | 361/737 |
| 5,388,091 | 2/1995 | Kagawa | 370/250 |
| 5,396,486 | 3/1995 | Scott | 370/31 |
| 5,442,803 | 8/1995 | Furuya | 455/15 |
| 5,448,620 | 9/1995 | Gershkovich | 379/390 |
| 5,472,351 | 12/1995 | Greco et al. | 439/353 |
| 5,533,019 | 7/1996 | Jayapalan | 370/352 |
| 5,550,861 | 8/1996 | Chan et al. | 375/222 |
| 5,568,513 | 10/1996 | Croft | 455/343 |
| 5,675,641 | 10/1997 | Watanabe | 379/391 |
| 5,734,643 | 3/1998 | Rondeau | 370/279 |
| 5,752,201 | 5/1998 | Kivari | 455/343 |

*Primary Examiner*—Ajit Patel
*Assistant Examiner*—Ricardo M. Pizzaro
*Attorney, Agent, or Firm*—Terry J. Anderson; Karl J. Hoch, Jr.

[57] ABSTRACT

Data transmission by a half-duplex transceiver over a full-duplex cellular telephone system using the EIA/TIA-553 standard is achieved by monitoring the forward channel to synchronize the transceiver with the forward channel signal, switching to transmit mode to transmit data on the reverse channel, and momentarily switching back to receive mode during the transmission at the projected times of occurrence of significant status bits on the forward channel in order to detect status bits whose timing controls operation of the transceiver.

8 Claims, 3 Drawing Sheets

HALF-DUPLEX COMMUNICATION SYSTEM FOR TELEMETRY MODEMS

FIELD OF THE INVENTION

The present invention relates to telemetry, and particularly to a system for transmitting telemetry data in a half duplex mode over conventional full-duplex cellular telephone systems.

BACKGROUND OF THE INVENTION

Commercial analog cellular telephone systems operate in a full-duplex mode, i.e. forward communication from the base station to the subscriber unit on one channel is carried on simultaneously with reverse communication from the subscriber unit to the base station on another channel. Consequently, the subscriber unit must have duplexer circuitry supporting simultaneous transmission and reception.

The commercial cellular telephone network lends itself ideally to the transmission of data from numerous unattended sensors (such as, for example, utility meters) to a central location. The cellular transceivers used by subscribers for this purpose are high-volume items for which cost is a significant factor. Inasmuch as telemetry data is only being communicated in one direction and the volume of data is small, half-duplex operation is sufficient. This in turn allows substantial cost savings for the telemetry units by omitting the duplexer circuitry.

Analog cellular telephony operates in accordance with a standard known as EIA/TIA-553. This standard requires the subscriber unit, while communicating on the reverse channel, to monitor the status of the reverse channel (which is shared by many subscriber units) via the continuously transmitting forward channel. This status is indicated by a busy-idle bit inserted into the pulse train, or bit stream, of the forward channel after every tenth or eleventh bit. When a call from the subscriber unit is initiated, the subscriber unit transmits an identifying signal on the reverse channel and starts a bit count. If the reverse channel goes busy before the 56th bit is transmitted by the subscriber unit, data transmission from the subscriber on the reverse channel is aborted because, presumably, another unit has seized the reverse channel. Conversely, if the reverse channel remains idle after 104 bits have been transmitted by the subscriber unit, subscriber transmission is aborted because the connection has failed.

It is therefore necessary, if half duplex operation is desired, to monitor the forward channel status bits while transmitting on the reverse channel, without using any duplexing circuitry. This has, so far, not been possible in the prior art.

SUMMARY OF THE INVENTION

The present invention allows a half duplex transceiver to monitor the forward channel status bits while transmitting data on the reverse channel, by using a variation of a look window technique originally developed to lock a radar jamming transmitter onto a hostile radar signal. The invention makes use of the fact that under the ETA/ITA-553 standard, data transmission on the forward channel is done in blocks. Each block begins with a 10 bit bit synchronization word (dotting sequence), followed by an 11-bit word synchronization word, and then by five consecutive repetitions of a set of two (A and B) 40-bit data words. The five transmitted repetitions of the data word sets are compared by a majority-vote circuit at the receiver to determine the correct value of each bit of the data words. An idle/busy status bit is inserted into the bit stream of the forward channel block before the bit synchronization word, before the word synchronization word, before the first repeat of the A data word, and after every ten bits of the data words. Consequently, once bit synchronization has been acquired, the positions of the status bits in the pulse train are known.

The system of this invention complies with the ETA/ITA-553 standard by momentarily switching to receive mode, during the data word section of the first block of a reverse channel transmission, whenever a significant status bit is expected to occur in the forward channel. The significant status bits are all the busy/idle status bits occurring before the 56th pulse train bit of the reverse channel block (which must all be idle), and the first status bit following the 104th bit of the reverse channel block (which must be busy).

The monitoring of the status bits in the system of the invention corrupts the first two-word data set, but this does not matter because the majority vote circuitry at the receiving end of the reverse channel will discard that set.

DESCRIPTION OF THE PREFERRED EMBODIMENT

Figure 1:
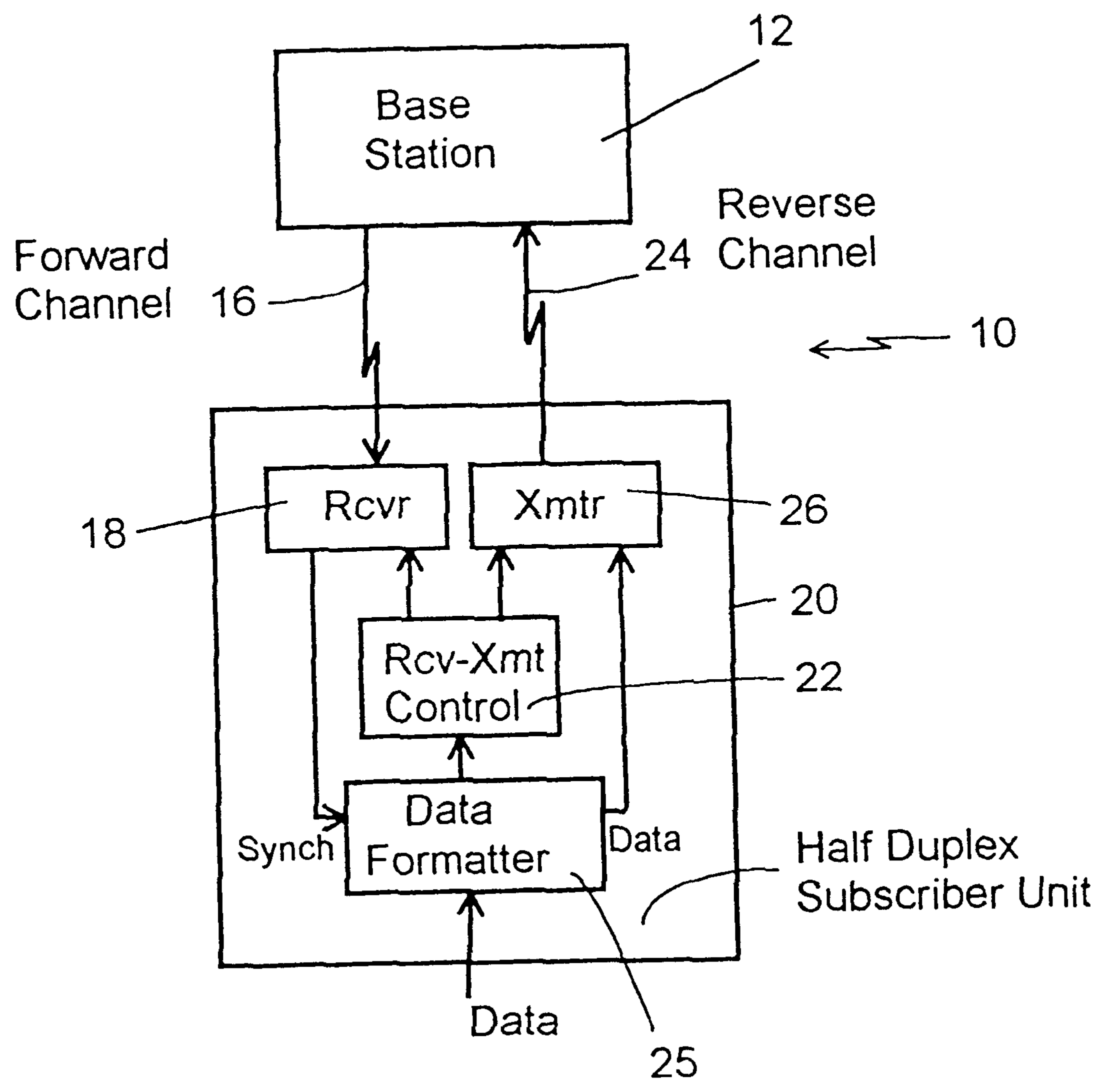
FIG. 1 is a block diagram of the system of this invention.

FIG. 1 illustrates the hardware of the cellular telephone system 10 to which this invention relates. The telephone company base station 12 continuously transmits a message stream structured as shown at 14 in FIG. 2 over the forward channel 16. This message stream is received by the receiver section 18 of the telemetry subscriber unit 20. The subscriber unit 20 is a half-duplex transceiver, i.e. it cannot receive and transmit at the same time. The unit 20 is switched between a receive mode and a transmit mode by a receive-transmit control 22. Because the unit 20 is a telemetry unit, it only needs to be able to receive polling query data on the forward channel 16 of the system. A response to a poll is then transmitted along with data to the base station 12 over the reverse channel 24.

When telemetry data is posted to the data formatter 25 to be transmitted or a poll response is required, the subscriber unit goes into the "send" mode and causes the transmitter 26 to transmit a reverse channel message to the base station 12 over the reverse channel 24. The base station 12 establishes communication with the subscriber unit 20 by changing the continually transmitted status bits of the forward channel 16 from "idle" to "busy".

In accordance with the EIA/TIA-553 standard, there is a specific window in which communication must be established by the base station 12 in order to be valid. If the base station status goes to "busy" in less than fifty-six bit intervals after the subscriber unit 20 begins its transmission, the reverse channel 24 has probably been seized by another unit, or the base station 12 has become unavailable for some other reason. In either instance, the call originating at the subscriber unit 20 is aborted and the transmitter 26 turned off. If the base station status is still "idle" after 104 bit interval communication on the reverse channel 24 can be assumed to have failed, and again the subscriber-originated call is aborted.

The forward channel 16 is a combination of a data stream and a busy/idle stream. These streams are independent in nature but have a defined time relationship such that the busy/idle bit stream can be extracted from the forward channel 16. For the purpose of the system of this invention, the forward channel 16 provides timing information to locate the busy/idle bits, as well as the busy/idle bit stream. The forward channel's data stream can be used to poll the subscriber unit 20 for a response or can be ignored for an application which sends unsolicited data.

Figure 2:
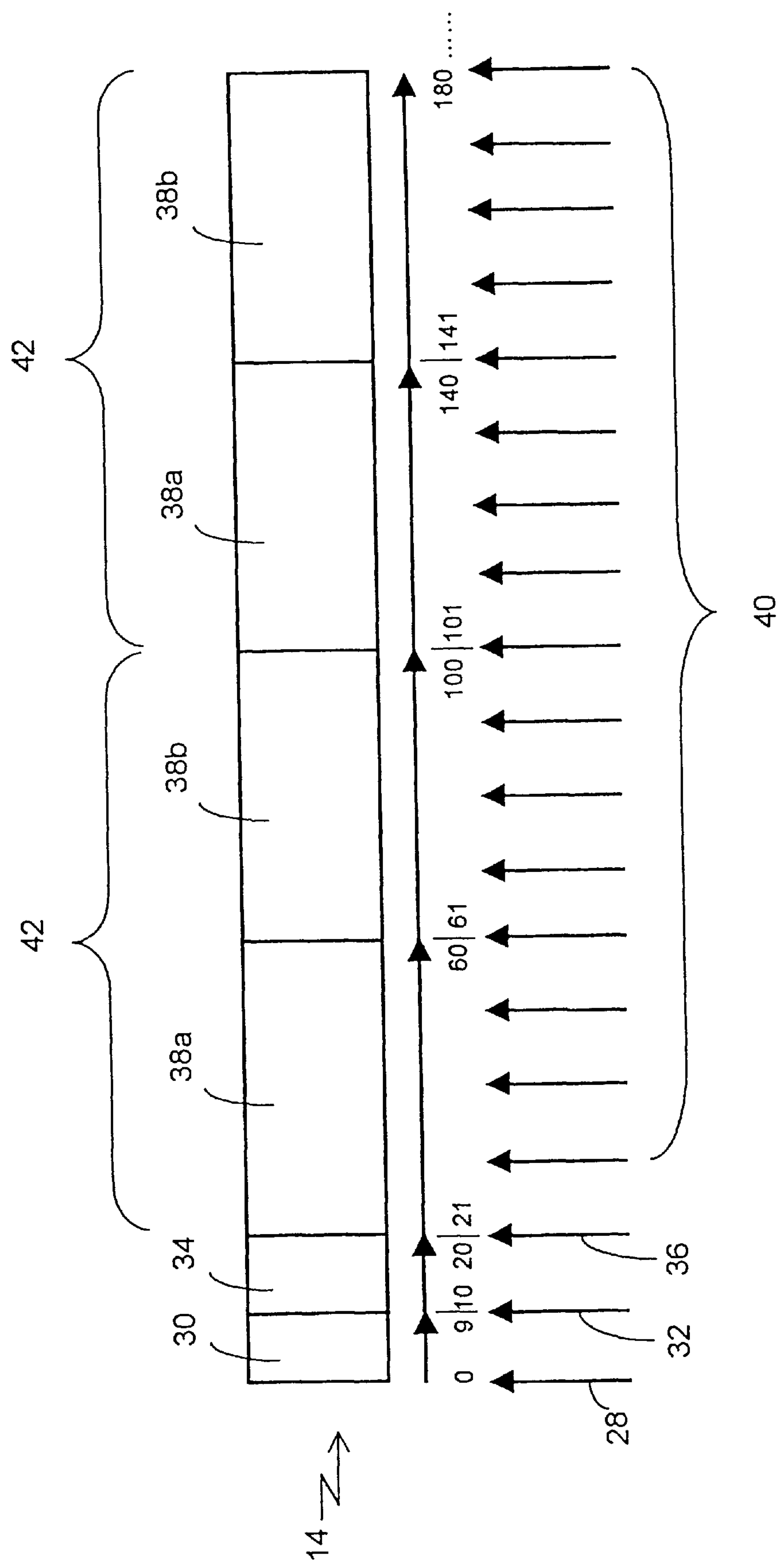
FIG. 2 illustrates the forward channel format according to the EIA/TIA-553 standard.

Digital communication over the forward channel 16 follows a specific format prescribed by the EIA/TIA-553 standard and illustrated in FIG. 2. Each block of the forward channel communication format 14 begins with a status bit 28, a ten-bit bit-synchronization word or dotting sequence 30, a status bit 32, an eleven-bit word-synchronization word 34, and another status bit 36. With synchronization established, data is then transmitted in the form of ten forty-bit words 38*a*, 38*b*, each of which consists of four groups of ten message bits. A status bit 40 is inserted after each group.

The ten message words 38*a*, 38*b* consist of five successive transmissions of a set 42 which includes a forty-bit message word 38*a* from a first message stream followed by a forty-bit message word 38*b* from a second message stream. The first message stream may represent communication information, while the second message stream may represent data. At the receiving end of the transmission, a conventional majority vote circuit (not shown) compares the five repetitions of the set 42 and eliminates random errors in the received bit stream.

Figure 3:
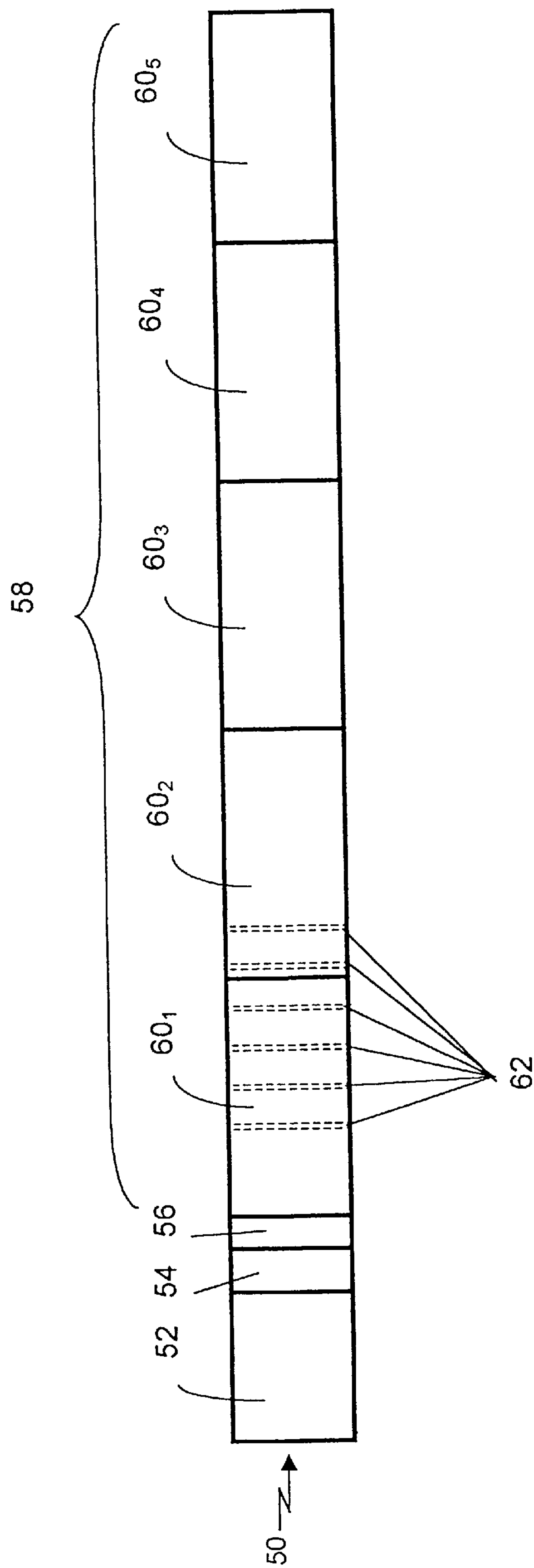
FIG. 3 illustrates the reverse channel format according to the EIA/TIA 553 standard.

Digital communication over the reverse channel 24 follows a specific format also prescribed by the EIA/TIA-553 standard and illustrated in FIG. 3. Each block 50 of the subscriber data stream formatted by the data formatter 24 begins with a thirty-bit bit-synchronization word 52, an eleven-bit word-synchronization word 54, and, a seven-bit digital color code 56. With synchronization established, data is then transmitted in the form of two-hundred-forty-bit messages 58 which consist of forty-eight-bit words 60 repeated five times as shown at $\mathbf{60}_1$ through $\mathbf{60}_5$.

In accordance with the invention, telemetry or other subscriber data can be transmitted over the above-described full duplex system 10 by a half-duplex subscriber unit 20 in the following manner: The subscriber unit 10 monitors the forward channel 16 at all times when powered to maintain synchronization with the busy/idle bit stream. When subscriber data is posted on the data formatter 25 for an unsolicited transmission, the unit 20 looks for an idle condition of the reverse channel by observing the busy/idle bit stream. If the reverse channel is idle, the subscriber unit 20 then switches to transmit mode and initiates a transmission.

As shown in FIG. 3, the thirty-bit bit-synch 52 is first transmitted and is followed by the eleven-bit word-sync 54 and the digital color code (DCC) 56 in an uninterrupted manner. Transmission is then continued with repeats 1 and 2 of the first message 58 to be transmitted. During this transmission, the subscriber unit 20 will switch to receive mode from time to time to monitor the forward channel busy/idle status bits. Because the forward and reverse channel data streams operate in an asynchronous manner with respect to each other, the exact data bits in the reverse data stream corresponding to the forward channel's busy/idle status bits cannot be delineated but can be expected to occur in windows 62.

The window 62 must be centered on a data bit which is sent with two level (binary) direct frequency shift keying. A "one" is sent with a nominal peak frequency deviation 8 KHz above the carrier frequency, and a "zero" is sent with a nominal peak frequency deviation 8 KHz below the carrier frequency. A conventional frequency discriminator (not shown) is used to generate a voltage level which is compared to a hard threshold to determine the state of the bit.

Data is coded in such a way that a "one" data bit is transformed into a zero-to-one transition. Thus the subscriber unit 20 must sample the forward stream at a rate of at least two times the bit clock to recover the busy/idle data bits. The sampling clock is generated by a conventional phase locked loop or clock recovery circuit (not shown) in the data formatter 25 which synchronizes with the forward data stream.

Synchronization must be approximately maintained with the data stream while the subscriber unit's transmitter is enabled, sufficiently so that the sampling clock slip is less than one-half of a data bit. This is accomplished in the preferred embodiment by using a conventional digital phase locked loop (not shown) which is allowed to run open loop during transmission. The receive window's minimum width is directly dependent on the phase lock loop's implementation. In the preferred embodiment, the window 62 is one bit time with a sampling clock rate of sixteen times the bit clock rate. This allows the short term drift in the subscriber unit and base station bit blocks to be re-synchronized by centering the transition, discussed above, in the receive window 62.

The forward channel's busy/idle status bits must be monitored (except during bit-synch, word-synch and DCC) through transmission of the reverse channel's bit number fifty-six, so that the subscriber unit 20 may determine that no other subscriber unit has captured the reverse channel 24. If the subscriber unit 20 determines that another subscriber unit has captured the reverse channel 24, the subscriber unit 20 aborts transmission and monitors the forward channel busy/idle stream until it again indicates "idle". At that time the subscriber unit 20 restarts the process of capturing the reverse channel 24.

Busy/idle bits occurring after the transmission of the reverse channel's bit fifty-six continue to be monitored for the appearance of a "busy" bit to verify that the subscriber unit 20 has captured the reverse channel. When the subscriber unit 20 has thus determined that it has captured the reverse channel, the subscriber unit 20 will begin transmission in an uninterrupted manner. Further monitoring of the forward channel busy/idle bit stream is not required, as indicated by the dotted representation of the rightmost windows 62 in FIG. 3.

If, on the other hand, the subscriber unit 20 has not yet captured the reverse channel by the transmission of bit number one hundred four, it is assumed that the capture process has failed, and that the subscriber unit 20 must abort transmission. The subscriber unit 20 then may immediately restart the capture process.

Typically, in an application such as utility metering, a meter identification and meter reading fits well into a single 40-bit data word, so that a transmission from a given subscriber unit occupies no more than one block of reverse channel time. Because each meter is read only at very long intervals, a single cellular telephone control channel can be used by a very large multiplicity of telemetry units.

If, however, the nature of the telemetry data is such that it requires more than one block time, the subscriber unit can continue to transmit as long as needed, as the capture of the reverse channel is only required at the start of transmission.

It will be noted that in order to capture the status bits as described above, the first transmission 60 and the second transmission 60 of the message word must be interrupted, as shown in FIG. 3. These interruptions or look windows 62 corrupt the message word involved, but corruption does not matter because this deliberate corruption is no different than the effect of random errors which the conventional majority-voting circuit at the receiving end (i.e the base station) is designed to eliminate.

The operation of the subscriber unit 20 for the transmission of unsolicited data can be summarized as shown in Table I below.

TABLE 1

Reverse Channel Arbitration Procedure

| Receive/Transmit | State | Activity |
|---|---|---|
| N/A | 1 | Subscriber unit power off |
| Receive | 2 | Subscriber unit synchronizes with forward channel |
| Receive | 3 | Maintain synchronization with forward channel and monitor busy/idle stream |
| Receive | 4 | Message posted to subscriber unit for transmission on reverse channel |
| Receive | 5 | Monitor forward channel and stay in state 5 until idle is indicated |
| Transmit | 6 | Begin transmission of data on reverse channel by transmitting the thirty-bit bit-sync, eleven-bit word-sync, and seven -bit digital color code |
| Receive/ Transmit | 7 | Continue transmission while generating look windows for busy/idle bits up to reverse channel bit number 56. Abort transmission if busy detected and go to state 5 |
| Transmit | 8 | Continue transmission on reverse channel while monitoring the forward channel's busy/idle bit stream via generating look windows for busy/idle bits until either reverse channel bit 104 is sent or a busy is detected. If a busy is detected before reverse channel bit 104 go to state 9; else abort transmission and go to state 5 |
| Transmit | 9 | Continue transmission of data on reverse channel through the fifth repetition of the message block |
| Transmit | 10 | If additional data words are to be transmitted, continue transmission and stay in state 11. Else return to state 3 or 1 |

It is understood that the exemplary- half-duplex communication system for telemetry modems described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

I claim:

1. A half-duplex subscriber unit for the one-way transmission of data over a full-duplex cellular telephone system using majority-vote detection of repeatedly transmitted message words, in which transmission of data from said subscriber unit over a reverse channel is governed by the condition, at predetermined significant times, of status bits inserted at predetermined intervals into a bit stream transmitted to said subscriber unit over a forward channel, comprising:

a) a receiver connected to said forward channel for receiving said bit stream;

b) a transmitter connected to a source of subscriber data including subscriber messages and to said reverse channel for transmitting said data over said reverse channel;

c) a transmit/receive control connected to said receiver and transmitter, said transmit/receive control being arranged to:

i) maintain said subscriber unit in receive mode to monitor said bit stream;

ii) switch to transmit mode when subscriber data is to be transmitted;

iii) temporarily switch to receive mode during the transmission of said subscriber data when a significant status bit is expected to appear in said bit stream;

iv) control the transmission of said data in response to the condition of said significant status bit; and d) a data formatter connected to said receiver and said transmit/receive control, said data formatter being arranged to synchronize with said bit stream and to cause said transmit/receive control to temporarily switch to said receive mode during the transmission of said subscriber data when a significant status bit is expected to occur in said bit stream.

2. The unit of claim 1, in which subscriber data is transmitted in the form of subscriber data blocks including subscriber message portions, and said temporary receive switching is done only during the transmission of the subscriber message portion of a subscriber data block, up to at least the fifty-sixth bit.

3. The unit of claim 2, in which said predetermined significant times include a first bit interval in said subscriber data block before which said status bits must be idle, and a second bit interval before which said status bits must have become busy, and said temporary receive switching is done only during the transmission of said message portion of said subscriber data block, and from a time prior to said first interval until the occurrence of a busy status bit between said first and second bit intervals.

4. The unit of claim 2, in which said subscriber unit is arranged to abort the transmission of said subscriber data if a busy status bit is received before said first bit interval, or if no busy status bit is received before said second bit interval.

5. The unit of claim 3, in which said first and second bit intervals are, respectively, the fifty-sixth and one hundred fourth bits of a block of subscriber data.

6. A method of providing one-way data transmission from a half-duplex subscriber unit in a full-duplex wireless telephone system using majority-vote detection of repeatedly transmitted message words in which said data transmission is governed by the condition, at predetermined times, of status bits in a bit stream received by said subscriber unit, comprising the steps of:

a) monitoring said bit stream to recover status bit status and timing information therefrom;

b) supplying subscriber messages to said subscriber unit for transmission thereby;

c) transmitting subscriber data including said subscriber messages without continuously monitoring said bit stream during said transmission;

d) generating receive mode windows at the expected time of occurrence of selected ones of said status bits;

e) interrupting said transmission, and monitoring said bit stream, during the transmission of said subscriber messages only for the duration of said windows;

f) detecting the condition of said selected status bits thus monitored;

g) controlling the transmission of said subscriber data in response to said condition; and h) synchronizing said transmission with the bit stream to facilitate temporarily switching said transmit/receive control to said receive mode during the transmission of said subscriber data when a significant status bit is expected to occur in said bit stream.

7. The method of claim 6, in which said subscriber data is transmitted in blocks containing non-repeated control words and repeated message words, said method further comprising the step of:

h) aborting said transmission of said subscriber data if a status bit having a predetermined, condition occurs prior to a first predetermined bit position of said block, or if a status bit having said predetermined condition fails to occur prior to a second predetermined bit position of said block.

8. The method of claim 7, in which said predetermined condition is a busy indication, and said first and second predetermined bit positions are, respectively, the fifty-sixth and one hundred fourth bits of said block.

* * * * *